United States Patent [19]

Mason

[11] 3,912,382
[45] Oct. 14, 1975

[54] MOTION PICTURE SYSTEM
[75] Inventor: Paul B. Mason, Magnolia, Mass.
[73] Assignee: Polaroid Corporation, Cambridge, Mass.
[22] Filed: Jan. 11, 1974
[21] Appl. No.: 432,769

Related U.S. Application Data
[62] Division of Ser. No. 227,151, Feb. 17, 1972, Pat. No. 3,809,465.

[52] U.S. Cl. .................. 352/72; 352/130; 354/78
[51] Int. Cl.² ...................................... G03B 17/52
[58] Field of Search ..... 352/72, 78, 130, 170, 78 C; 354/78; 116/114 J

[56] References Cited
UNITED STATES PATENTS

| | | | |
|---|---|---|---|
| 3,616,740 | 11/1971 | Eloranta ............................ | 354/317 |
| 3,623,417 | 11/1971 | Eloranta et al. .................. | 352/72 X |
| 3,654,848 | 4/1972 | Sharp................................ | 354/317 |
| 3,666,361 | 5/1972 | Pankow et al. .................. | 352/78 C |
| 3,667,361 | 6/1972 | Meggs............................... | 354/318 |
| 3,672,752 | 6/1972 | Young et al. .................... | 352/198 X |
| 3,724,935 | 4/1973 | Batter ............................... | 352/78 C |
| 3,829,205 | 3/1974 | Downey............................ | 352/78 R |

Primary Examiner—Monroe H. Hayes
Assistant Examiner—Alan Mathews
Attorney, Agent, or Firm—David R. Thornton

[57] ABSTRACT

A multipurpose film handling cassette mountable in a viewer to perform alternate operational programs on the film strip, one such program involving the application of a processing fluid to the film. The cassette includes an applicator system having a coating roller, a rupturable pod of processing fluid, a reservoir chamber and a wick connecting the reservoir chamber to the coating roller. This applicator system is mounted for displacement between a first position wherein the coating roller is spaced from the film strip and a second position wherein it engages the film strip. A lever arm extends from a pin having a slotted recess accessible to a sensor-actuator pin of the viewer so that it may be rotated thereby to selectively displace the applicator system into its second position and rupture the fluid pod. The coating roller is adapted to be reverse driven by a film guide roller of the cassette. When the applicator system is returned to its first position, the aforementioned slotted recess assumes an orientation different from its initial orientation.

16 Claims, 10 Drawing Figures 3,912,382

MOTION PICTURE SYSTEM

CROSS REFERENCE TO RELATED APPLICATIONS

This application is a division of U.S. application Ser. No. 227,151 filed Feb. 17, 1972 now Pat. No. 3,809,465.

BACKGROUND OF THE INVENTION

1. Field of the Invention

This invention relates to photography and, more particularly, to multipurpose motion picture cassette systems having a film processing capability.

2. Description of the Prior Art

Many important improvements have been made in recent years in motion picture photography to reduce or simplify the functions performed by the operator. In this respect, cassette or cartridge systems are now playing a major role in this rapidly expanding field. For example, film handling cassettes are now available which are adapted to be quickly mounted as a unit into a camera for exposure purposes. After the film has been exposed, the cassette containing the film can be quickly removed from the camera and sent to a processing laboratory. Also, specially designed projectors are now available which accept quick mounting cassettes containing fully processed film. These latter systems not only greatly ease the job of projecting the film, but also provide a convenient permanent storage container for the film, i.e., a cassette from which it is never necessary to withdraw the film for projection purposes.

However, neither of these significant improvements has eliminated the major inconvenience associated with home photography, i.e., the time delay between the taking of the photograph and its availability for projection. Additionally, while such camera cassettes simplify the procedures of loading film into and removing film from a camera, they do not simplify the multi-step laboratory development process which requires the repackaging of the film for projection purposes.

The field of still photography is no longer hampered by extensive periods of delay associated with processing exposed film. The impact on the public of the one-step photographic process employing diffusion-transfer techniques is a matter of record and generally well known. The home photographer can now enjoy the fruits of his efforts in a matter of seconds. This important convenience has been available to the still photographer for many years.

Important technological advances now make it possible for the home photographer interested in motion pictures to enjoy the same convenience. Radically different motion picture systems have recently been developed employing compact multipurpose cassettes permitting the photographer himself to quickly and easily process and project the film strip shortly after the pictures have been taken. Exemplary of such new and unique systems are those described in copending patent application Ser. No. 738,464 of Edwin H. Land filed June 20, 1968, now U.S. Pat. No. 3,655,277 issued Apr. 11, 1972 and U.S. Pat. No. 3,615,127 issued to Edwin H. Land on Oct. 26, 1971.

In commercial and industrial applications, such rapid motion picture processing systems are not only an improvement as a matter of convenience, but have other important effects as well. For instance, motion picture newsreel programs can be presented on television for the viewing public shortly after events of interest have occurred and been photographed.

Considerable funds and effort are currently being expended to further improve and refine various features of these systems in order to reduce their cost, to further simplify the task of the operator, to improve their reliability, and to improve the quality of the final product. Typically, the film handling cassettes forming part of such systems include a processing station in which a processing fluid is applied to the film strip after exposure thereof and as the exposed film strip is progressively advanced through such station. The present invention is directed to an improved arrangement for processing a strip of exposed photographic material in a system of the type indicated.

A primary object of this invention, therefore, is to provide an improved system for applying a processing fluid to a strip of exposed photographic material.

Another important object of this invention is to provide an improved compact multipurpose motion picture film handling cassette having a film processing capability.

An additional object of this invention is to provide a cassette of the type indicated incorporating a coating roller processing system.

A further object of this invention is to provide a cassette of the type indicated having an improved arrangement for rendering an applicator system housed therein operable.

Also, an object of this invention is to provide a multipurpose film handling cassette of the type indicated which includes an improved arrangement for indicating when the film strip housed therein has been processed.

Yet another object of this invention is to provide a cassette of the type indicated which includes an improved arrangement for controlling the rate at which processing fluid is applied to the film strip housed therein.

A still further object of this invention is to provide improved photographic apparatus to facilitate the processing of a strip of photographic material housed within a compact multipurpose film handling cassette.

Yet another object of this invention is to provide an improved cassette and apparatus for cooperating to perform alternate operational programs of film housed within the cassette, the cassette and apparatus having unique cooperating indicator and sensing means for automatically effecting the desired operational program.

SUMMARY OF THE INVENTION

In its illustrated embodiment, the present invention briefly comprises a compact multipurpose motion picture film handling cassette having an opening to facilitate exposure and projection operations and a processing station to facilitate film processing operations. The cassette is provided with a pair of coplanarly mounted supply and takeup spools and is initially furnished with an elongated strip of exposed photographic material substantially entirely coiled around the supply spool and extending through the processing station and across the aforementioned opening to the takeup spool. Pivotally mounted within the cassette's processing station is an applicator system adapted to be displaced between a position wherein it is disposed out of operable relationship with respect to the strip of photographic material and a second position wherein it is disposed in operative relationship to such strip of material. A spring continually urges this applicator system towards its first stated position. Comprising part of the applicator system is a rupturable pod of processing fluid, a reservoir chamber into which such fluid is adapted to flow when released from such pod, a coating roller and a wick for feeding fluid from the reservoir chamber to the coating roller. When the applicator is displaced into its stated second position, the coating roller engages both an incremental section of the film strip and a drive wheel associated with a roller of the cassette around which the film strip is disposed as it is advanced through the cassette's processing station. In this manner, the coating roller is driven in the direction opposite to that in which the film is advanced through the processing station during processing operations.

Displacement of the applicator system into its operative position is effected by a lever pivotally or rotatably mounted within the cassette and adapted to exert a compressive force on the applicator system's pod under the influence of an externally mounted force applying or actuating member. In this arrangement, as the lever is pivoted from its initial position into a second position, it first displaces the applicator system into its second position and then effects a rupturing of the pod. A compressed section of the applicator system's wick controls the rate at which the fluid is fed from the reservoir chamber to the coating roller. After film processing operations have been completed and the externally mounted actuating member disengaged from the cassette's lever arm, the force exerted on the applicator system by the aforementioned spring returns that system to its original position causing the lever arm to be displaced into a third position intermediate its first and second positions.

Film exposure operations are conducted with the cassette mounted in an appropriate camera as the unexposed film strip is advanced past the cassette's opening onto its takeup spool. The cassette may then be removed from the camera and inserted into a viewer adapted to facilitate film processing and projection operations. Such viewer includes a drive shaft adapted to engage the cassette's supply spool and a sensor-actuating member which in combination with an associated switch detects the condition of the cassette's lever arm and is adapted to engage the cassette's lever arm and effect a displacement of the applicator system into its second position if that lever arm is in its initial position. Thus the viewer includes means for sensing whether or not the film strip within the cassette has been processed, i.e., for sensing the orientation of the cassette's lever arm, and programming the system operation accordingly.

Assuming that the film strip has not been processed, its aforementioned sensor-actuating member displaces the cassette's lever arm so that the coating roller engages both the film strip and the cassette's aforementioned drive roller and the fluid containing pod is ruptured. Thus processing fluid from the cassette's applicator system may be applied to the film strip as it is returned from the cassette's takeup spool to its supply tool.

A prism mounted behind the section of the film strip disposed across the cassette's aforementioned opening facilitates subsequent projection operations as a drive shaft of the viewer energizes the cassette's takeup spool and a claw of the viewer intermittently advances the film strip across that opening on its return to the takeup spool. Thereafter the sensor-actuator member and its associated switch will receive an indication from that cassette that its film strip has been processed and the viewer and cassette cooperate to perform only a projection program on the film strip.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
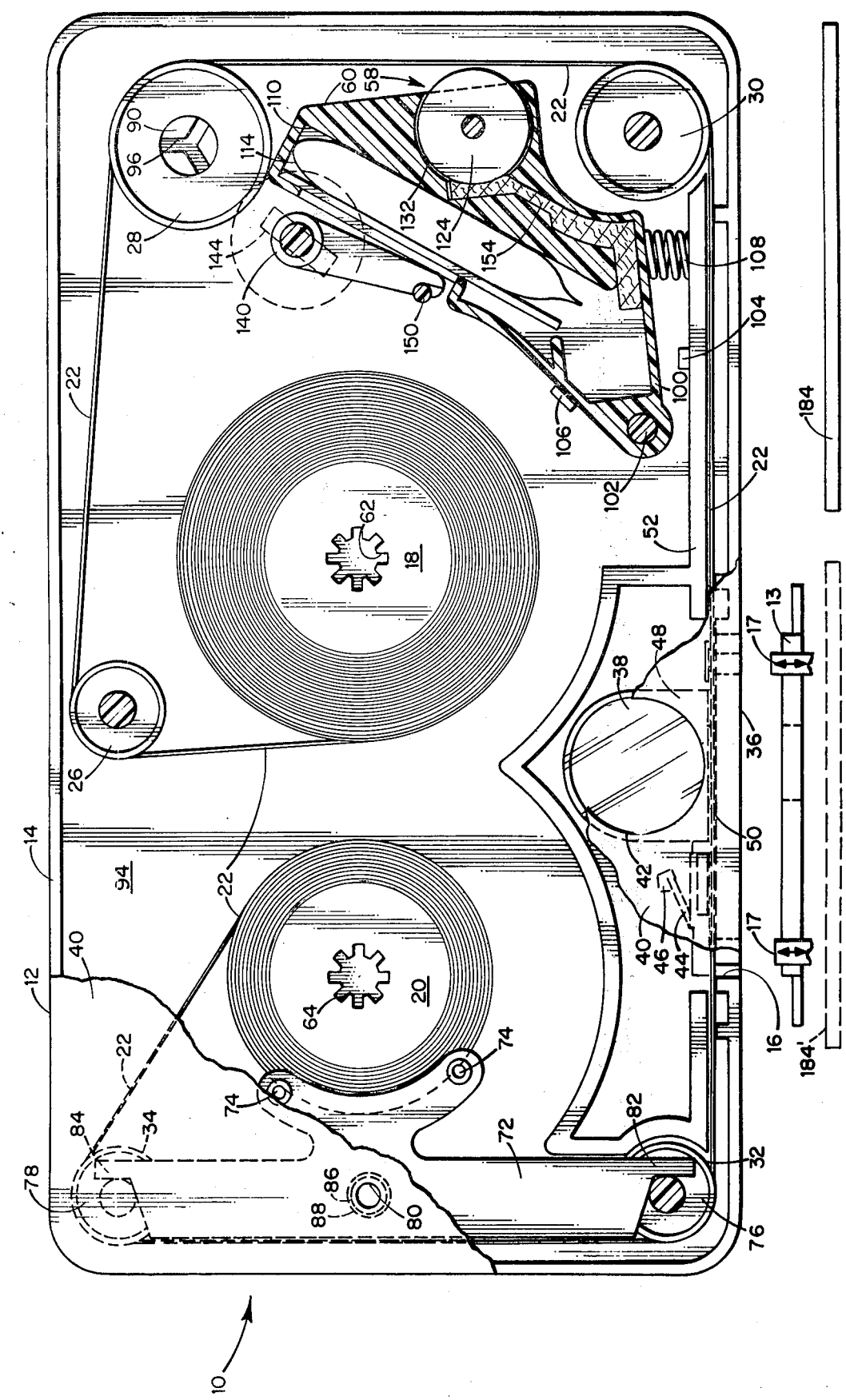
FIG. 1 is a diagrammatic cutaway plan view of a compact multipurpose motion picture film handling cassette embodying features of this invention.

A preferred embodiment of this invention is illustrated as facilitating the application of a compatible processing fluid to a film structure which comprises both a photosensitive image-recording layer and an image-receiving layer in which a visible image may be formed by image-forming substances transferred by diffusion from the photosensitive layer without necessitating the subsequent removal of the processed photosensitive layer. This highly desirable type of film structure is made possible by a developed negative image having low covering power.

In typical silver halide diffusion-transfer reversal processes for the production of black-and-white images, a silver halide developer and a silver halide solvent are applied in an aqueous alkaline solution to a photoexposed silver halide stratum or emulsion where they develop exposed silver halide to sliver and react with unreduced silver halide to form a soluble silver complex. This complex, in order to form a positive print, is transferred and reduced to silver on a silver-receptive stratum upon which the silver halide stratum has been superposed. It has generally been the practice, in the completion of this process, to separate the silver-receptive and silver halide strata in order to render the positive image visible, particularly when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive images in superposition provide a composite that presents a good image for projection purposes as long as the images are carried on a light-transmitting support. Since the silver halide stratum and the silver receptive stratum need not be separated, a simplification of the overall silver halide diffusion-transfer reversal process is achieved.

A composite film assembly of this type as well as processing compositions for producing a stable black-and-white image which can be viewed by transmitted light without the necessity of removing the processed negative image-containing photosensitive layer is shown in prior U.S. Pat. No. 2,861,885 of Edwin H. Land which issued on Nov. 25, 1958. Other composite film assemblies capable of producing photographic records which can be exhibited in full color without the necessity of removing the processed photosensitive layer are shown in prior U.S. Patents of Edwin H. Land Nos. 2,726,154 issued Dec. 6, 1955 and 2,944,894 issued July 12, 1960. All of these prior patents are assigned to the assignee of the present invention.

However, it should be noted that the present invention is not directed to the chemistry by which visible images are formed in an exposed photosensitive material and/or found in an image-receiving stratum associated therewith. While an illustrated preferred embodiment of this invention is shown effecting the application of a compatible processing fluid to a film structure not requiring the removal of the photosensitive layer after visible image formation is completed, the invention itself is also applicable for use with other types of processing fluids and film structures.

The illustrated preferred embodiment of this invention may best be understood by first referring to FIG. 1 of the drawings which illustrates a cassette 10 typical of the type with which the present invention is intended to operate. As shown therein, the compact multipurpose film handling cassette 10 is basically constituted by a pair of housing members 12 and 14 connected together to form an enclosed opaque housing. Cut out portions of these housing members 12 and 14 define an opening or film gate 16 through which image carrying light rays may enter and/or leave the cassette 10 and, further, which facilitates the positioning of an aperture plate of a camera and/or projector in operative relationship to elements of the cassette. FIG. 1 diagrammatically illustrates such an aperture plate 13 of a viewer unit 99 (See FIG. 7) and displaceably mounted pins 17 of that viewer unit, the function of which will be explained hereinafter.

In this embodiment, the cassette 10 is relatively flat and generally rectangular parallelepiped in configuration. A supply spool 18 and a takeup spool 20 are coplanarly mounted within the cassette 10 for rotation about parallel axes. A strip of initially unexposed photographic material 22, of the type previously discussed and provided with perforations 24 (See FIG. 6) and leaders respectively affixed to the supply spool 18 and to the takeup spool 20, is initially substantially entirely coiled around the supply spool 18. Passing from the supply spool 18 to the takeup spool 20, the strip of photographic material 22 sequentially travels around rollers 26, 28, 30, 32 and 34. Advantageously, the rollers 30 and 32 are positioned in respective corners or extremities of the cassette 10 on the same side of the supply spool 18 and the takeup spool 20. Additionally, the roller 28 is advantageously positioned in the corner of the cassette 10 disposed on the other side of the supply spool 18 from the takeup spool 20 and on the opposite side of those spools from the rollers 30 and 32.

Mounted within the cassette 10 so as to be in alignment with its opening 16 is a pressure plate assembly 36 in which is mounted a light reflecting element 38. The wall 40 of the cassette 10 includes an opening 42 communicating with the cassette's film gate 16 and aligned with the light reflecting element 38. Thus the light reflecting element 38 is disposed in operable relationship to both the openings 16 and 42 of the cassette 10. In the preferred embodiment, the light reflecting element 38 is prismatic in nature and includes a light receiving transparent face adjacent the opening 42 and a reflecting surface which reflects light received into the element through that transparent face outwardly thereof through a convex transparent face disposed adjacent the cassette's opening 16. This arrangement permits light rays from an externally mounted source of illumination to be introduced into the cassette 10 through its opening 42 and then redirected outwardly thereof through its film gate 16.

The pressure plate assembly 36 includes a leaf spring 44 which seats against a boss 46 formed integrally with the housing member 14 to continually urge the pressure plate assembly towards the cassette's opening 16. At the same time, this arrangement permits the pressure plate assembly 36 to be displaced inwardly of the cassette 10 away from the opening 16 whenever the aperture plate of a camera of the viewer 99 is positioned in operative relationship therewith. In this connection, the pins 17 may be selectively driven inwardly of the cassette to displace the pressure plate assembly 36 away from the aperture plate 13 to relieve friction on the film strip 22 and thereby facilitate rewind of the film strip onto the supply spool 18 when the cassette is in the viewer 99. Forming part of the pressure plate assembly 36 is a mounting bracket 48 which serves to fixedly position the light reflecting element 38 with respect to the pressure plate assembly and, more particularly, with respect to an aperture 50 of that assembly.

Mounted interiorly of the cassette 10 is a light sealing member 52 which extends adjacent the film strip 22 from a position in the vicinity of the roller 30 to within the vicinity of the roller 32. This light sealing member 52 extends adjacent the edge of the opening 42 provided in the wall 40 thereby cooperating with the housing members 12 and 14 to define a first section of the cassette 10 in which the spools 18 and 20 are positioned which is sealed in a light-tight manner from that portion of the cassette in which the light reflecting element 38 is located.

The cassette 10 further comprises a normally inoperative processing station 58 including an applicator system 60 for selectively applying a processing fluid to incremental sections of the film strip 22. The nature of this applicator system 60 and the arrangement for selectively rendering it operable will be discussed in further detail hereinafter. However, at this point it should be noted that this processing station 58 is located so as to effect a treatment of the film strip 22 with processing fluid intermediate the rollers 28 and 30.

The spools 18 and 20 are respectively provided with fluted recesses 62 and 64 which are adapted to receive externally mounted drive means through apertures 66 and 68 (See FIG. 7) appropriately provided through the cassette's wall 40. When the cassette 10 is mounted in the viewer 99 the supply spool 18 and takeup spool 20 are respectively selectively engaged by drive shafts 19 and 21 operated by a solenoid 23 of that unit (See FIG. 8). Thus, the cassette 10 includes means for reversibly transporting the strip of photographic material 22 through a normally inoperative processing station 58 disposed intermediate the rollers 28 and 30 and across the pressure plate assembly 36. The cassette's opening 16 serves to define an exposure station during a first pass of the photosensitive film strip 22 across the pressure plate assembly 36 and to define a projection station during subsequent operations in which the film strip, in a fully processed condition, is advanced from the supply spool 18 to the takeup spool 20.

It should also be noted at this point that a resilient member 72 is connected to the inside face of the wall 40 by any suitable means, such as rivets 74, and extends over and in spaced apart relationship to the end surfaces 76 and 78 of the rollers 32 and 34, respectively. Provided in the wall 40 is an aperture 80 disposed over the resilient member 72 whereby a snubber pin 73 (See FIG. 7) of the viewer 99 may be selectively introduced into the cassette 10 upon operation of a solenoid 75 (See FIG. 8) to urge the resilient member's end portions 82 and 84 into frictional engagement with the rollers 32 and 34, respectively, to restrain further rotational movement of those members. Rotation of these rollers 32 and 34 may also be restrained by an appropriately positioned snubber pin when the cassette 10 is mounted in a camera (not shown). In order to effectively light seal the interior of the cassette 10, a ring 86 mounted on the resilient member 72 is coaxially disposed with respect to the aperture 80 and adapted to seat in an annular recess 88 of the cassette's wall 40.

Roller 30, around which the film strip 22 passes on its way from the supply spool 18 to the pressure plate assembly 36 may, if desired, be mounted on a movable post spring biased towards the corner which it occupies in the housing of the cassette 10 and capable of being moved resiliently inward away from that corner. Also, roller 32 may be spring biased towards the corner which it occupies in the housing of the cassette 10 and capable of being moved resiliently inward away from that corner. This represents one way to minimize strain exerted on the film strip 22 by conventional intermittent film advancement structure during exposure and projection operations. The intermittent film advancement mechanism of the viewer 99 may include a conventional claw 192 (See FIG. 8) and drive therefor.

Figure 6:
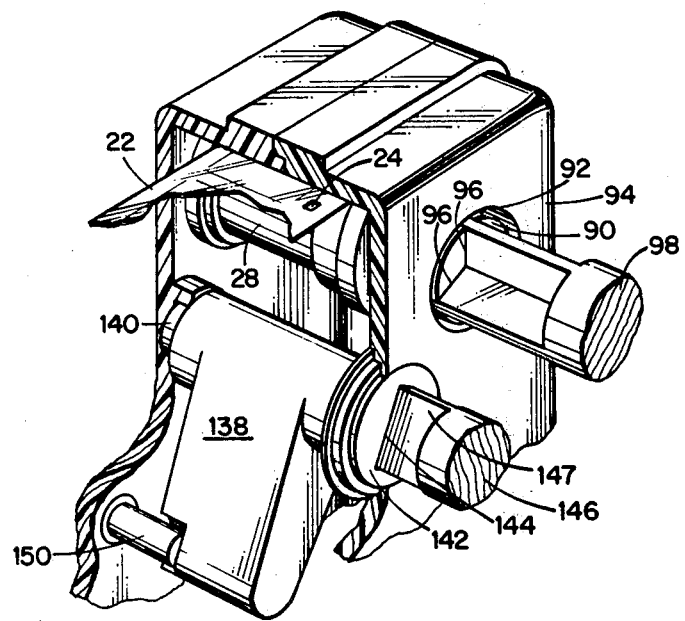
FIG. 6 is a diagrammatic sectional view in perspective illustrating the arrangement for driving the cassette's lever arm.

Preferably, during film processing operations the film strip 22 is advanced through the cassette 's processing station 58 at a constant speed. In this connection, the roller 28 is adapted to be driven at a constant rate of speed at such time by a drive shaft of the viewer 99. As best shown in FIG. 6, a circular projection 90 of the roller 28 extends through an opening 92 in the cassette's wall 94 and is provided with a plurality of radially extending slots 96. Complementary annular projections (not shown) respectively extending into overlapping relationship from the roller 28 and the inside face of the wall 94 serve to preclude light rays from penetrating into the interior of the cassette 10 through its opening 92. An externally mounted force applying member which, in the preferred embodiment, comprises a specially configured drive shaft 98 of the viewer unit 99 shown in FIG. 7 of the drawings, is adapted to be selectively displaced into engagement with the slots 96 under the influence of a solenoid 95 and to effect a constant speed rotation of the roller 28 in a counterclockwise direction as viewed in FIGS. 1 and 6 of the drawings under the influence of a step-motor 144 (See FIG. 8). In this manner, after the film strip 22 has once been transported onto the takeup spool 20 from the supply spool 18, it may be drawn through the processing station 58 at a constant speed while being returned to the supply spool and wrapped therearound in turns of increasing radii. The supply spool 18 is driven through a slip clutch drive shaft mechanism of the viewer unit 99 at such times so as to maintain a constant tension on that portion of the film strip 22 disposed around the roller 28. Back tension may be applied to the film 22 as it is advanced through the processing station 58 by applying a limited amount of braking force to the takeup spool 20 through its drive shaft 21 - slip clutch arrangement.

An important aspect of this invention is the cassette's applicator system 60 and the arrangement for rendering such system operable to facilitate film processing operations. This applicator system 60 comprises a housing 100 pivotally mounted within the cassette 10 on a pin 102 for displacement between a first inoperative position shown in FIG. 1 of the drawings and a second position shown in FIG. 3 of the drawings. Pivotal movement of the applicator system 60 in a clockwise direction as viewed in these drawings is limited by a stop 104, while pivotable movement thereof in a counterclockwise direction is limited by a stop 106. A spring 108 acting against the housing 100 continually urges the applicator system 60 into its inoperative position, i.e., its position depicted in FIG. 1 wherein it is seated against the stop 106.

Positioned against a support surface 110 within a first section 112 of the housing 100 is a rupturable pod or container 114 which initially contains a quantity of processing fluid 116 suitable to force visible images from images recorded on the film strip 22 during exposure operations. Typically, the walls of the rupturable pod 114 may consist of an an outer layer of pouch or glassine paper, an intermediate layer of lead foil and an inner liner of polyvinylchloride material. The polyvinylchloride layers are bonded together adjacent their edge portions to effect the sealing of the fluid filled cavity with a seal 118 being substantially weaker than the seals around the other edges of the pod 114. In order to fixedly position the pod 114 within the section 112 of the applicator system 60, it may be adhered by any suitable means to the support surface 110. The end of the pod 114 comprising the weakened seal 118 is disposed immediately above a reservoir chamber 120 provided within the housing 100. Disposed over the pod 114 is a pressure plate 122 which is adapted to be displaced inwardly of the housing 100 towards the support surface 110 to exert a compressive force against the rupturable pod 114. Thus, it will be appreciated that when this pressure plate 122 is displaced inwardly of the applicator's housing with sufficient force, the pod's weakened seal 118 will rupture responsive to a predetermined hydraulic pressure being developed within the processing fluid 116. At such time, the processing fluid 116 initially housing within the pod 114 will be expelled therefrom into the applicator system's reservoir chamber 120.

Figure 2:
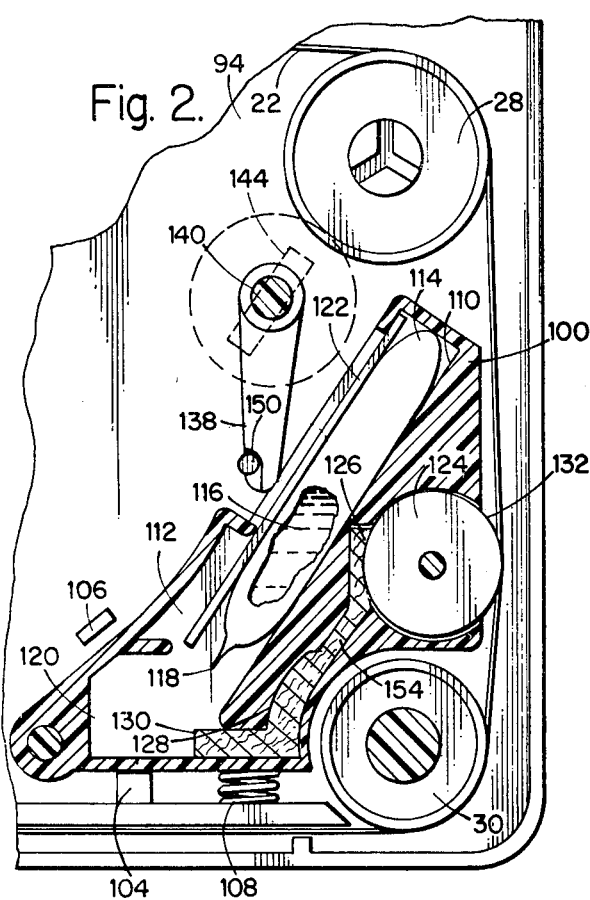
FIG. 2 is a fragmentary diagrammatic cutaway plan view of a section of the cassette illustrated in FIG. 1 showing the applicator system thereof in its second position prior to the rupturing of its fluid containing pod.
Figure 3:
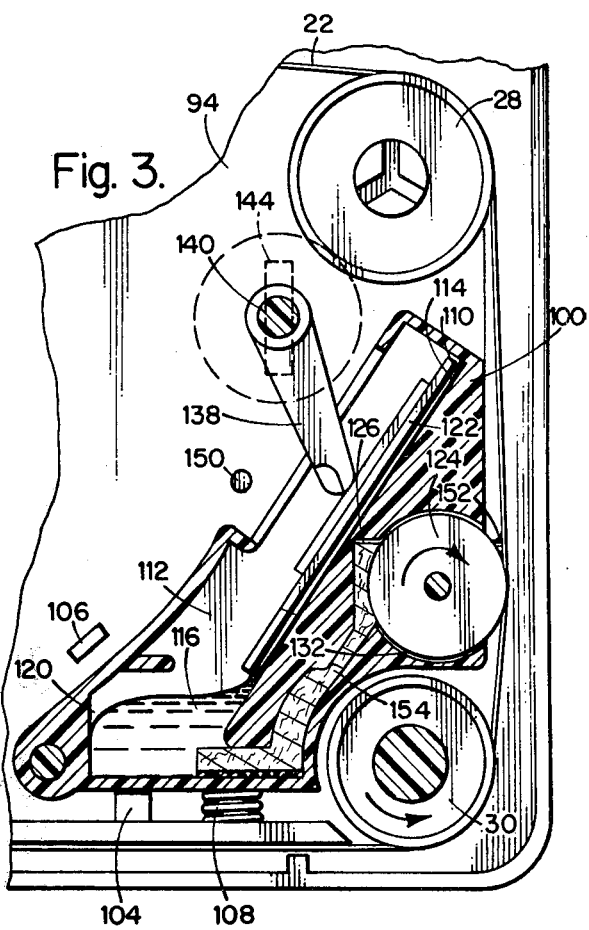
FIG. 3 is a view similar to FIG. 2 illustrating the applicator system of the cassette disposed in its operable position immediately after its pod has been ruptured.

Rotatably mounted in the housing 100 of the applicator system 60, in a coating roller 124 located to engage a section of the film strip 24 disposed in the cassette's processing station 58 whenever the applicator system 60 is displaced into its position depicted in FIGS. 2 and 3 of the drawings. One end 126 of a wick 128 is seated against a section of the peripheral surface 132 of the coating roller 124, while its other end 130 extends into the applicator system's reservoir chamber 120. In this manner, means are provided for feeding processing fluid contained within the reservoir chamber 120 by capillary action to the coating roller 124.

Figure 5:
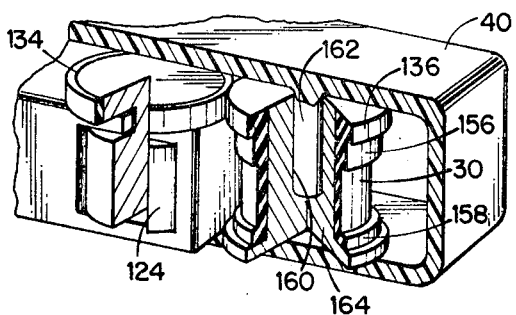
FIG. 5 is a diagrammatic sectional view in perspective illustrating the driving arrangement for the coating roller of the cassette's applicator system.

As best shown in FIG. 5 of the drawings, a drive wheel 134 is axially connected to the coating roller 124. This drive wheel is adapted to engage an annular projection 136 provided on the cassette's roller 30 when the applicator system is displaced into its operative position shown in FIG. 3. The operating surfaces of these elements, i.e., of the drive wheel 134 and annular projection 136, are preferably formed of a high friction material such as a synthetic rubber or polyurethane to minimize slippage therebetween during film processing operations.

The peripheral surface of the roller 30 is formed with a pair of spaced apart shoulders 156 and 158 (See FIG. 5) disposed a greater distance from the axis of the roller than are those portions of the roller's peripheral surface intermediate thereof. These shoulders 156 and 158 are sized and spaced apart a carefully predetermined distance so that respective edge sections of the film strip 22 are seated thereon as the film strip passes therearound. In this connection, the portion of the film strip 22 adapted to have images recorded thereon is positioned intermediate of the shoulders 156 and 158 and, consequently, out of contact with the roller's peripheral surface. This arrangement precludes any contact between the roller 30 and the portion of the film strip 22 adapted to be exposed and processed. It will be noted that the roller 30 is provided with an axixally extending recess 160 adapted to facilitate its mounting on a post 162 formed integrally with and extending from the cassette's wall 40. To provide for ready rotational movement of the roller 30 within the cassette 10, it is highly desirable that those portions of the roller adapted to contact the post 162 and the post 162 itself be formed of a material having a relatively low coefficient of friction. For instance, the main body portion 164 of the roller 30 may be formed of a low friction polymeric material such as an acrylic, a polystyrene or acetal. In contrast thereto, it is desirable that relatively high frictional forces exist between the film strip 22 and the portions of the rollers 30 adapted to contact same. Therefore, preferably, the shoulders 156 and 158 may, for instance, comprise a relatively high friction polymeric material such as a synthetic rubber or a polyurethane. As indicated, the opposite edges of the film strip 22 seat on respective shoulders 156 and 158 of this relatively high friction material. In this manner, relatively low frictional forces are effected between the roller 30 and the post 162, while relatively high frictional forces are effected between that roller and the strip of photographic material 22.

Advantageously, the roller 30 may be formed by an inexpensive two-step injection molding process employing the materials suggested. First, its main body portion 164 is formed in an injection mold. Then this portion 164 is employed in a second injection molding process wherein the relatively high friction material, including the shoulders 156 and 158 and the peripheral surface of the annular projection 136, is formed around the periphery of the roller's main body. It will also be appreciated that, if desired, the other rollers of the cassette 10 may comprise a similar arrangement except, of course, they could not include the circular projection 136.

In this arrangement, the coating roller 124 is driven in the direction opposite to that which the film strip 22 is advanced through the processing station 58 at such time as the applicator system 60 is rendered operable. More specifically, during such processing operations, the film strip 22 is advanced through the processing station 58 by the aforementioned action of the roller 28 thereby imparting a counterclockwise rotation to the cassette's roller 30 as shown in FIG. 3 of the drawings which roller, in turn, drives the coating roller 124 in a clockwise direction.

Displacement of the applicator system 60 from its initial position depicted in FIG. 1 of the drawings into its operable position depicted in FIG. 3 of the drawings and the rupturing of the pod 114 is effected by a lever arm 138. This lever arm 138 is integrally formed on a pin 140 journaled between the cassette's walls 40 and 94 as best shown in FIG. 6. One end of the pin 140 terminates in a circular extension 142 set flush with the outside face of the cassette's wall 40 and which is provided with a slotted recess 144 adapted to receive an externally mounted force applying member (See FIG. 6). In the illustrated embodiment of this invention, this force applying member comprises a sensor-actuating pin 146 of the viewer 99 (See FIG. 7) mounted for axial movement to selectively seat its flattened end 147 in the slotted recess 144 and also mounted for a limited amount of rotational movement under the influence of a conventional step motor 149, depicted in FIG. 8, which may take a conventional form. The mounting arrangement for the pin 140 between the cassette's walls 40 and 94 is of a high friction type such that substantial force is required to effect a rotation of that pin.

As the cassette is initially furnished, the lever arm 138 is seated against a post 150 extending from the inside face of the cassette's wall 94 which serves to limit the extent to which the lever arm can be rotated in a clockwise direction as viewed in FIGS. 1 and 2. Subsequent to film exposure operations during which, as will be more fully explained, the film strip 22 is advanced from the supply spool 18 onto the takeup spool 20, the processing station 58 may be rendered operable by employing the sensor-actuating pin 146 to effect a displacement of the cassette's lever arm from its position shown in FIG. 1 of the drawings into its position shown in FIG. 3. As the lever arm begins to move away from the post 150 it engages the pressure plate 122 of the applicator system 60 and causes the entire applicator system to pivot on the pin 102 into its position depicted in FIGS. 2 and 3. At such time as the lever arm has been displaced into its position shown in FIG. 2, the applicator system is seated against the stop 104 against the force exerted on its housing 100 by the spring 108 and the coating roller 124 is firmly engaged against an incremental section of the film strip 22. However, the processing fluid 116 is still retained within the pod 114. Further displacement of the housing 100 in a clockwise direction is precluded by the stop 104. Continued displacement of the lever arm 138 by the step motor 149 into its position shown in FIG. 3 causes the weakened seal 118 of the pod or container 114 to rupture and the processing fluid to be expelled from that pod into the applicator system's reservoir chamber 120. At such time, a certain amount of this processing fluid 116 is drawn from the reservoir chamber 120 and fed to the coating roller 124 by the wick 128. Also, it will be recalled that the drive wheel 134 is now firmly seated against the annular projection 136 of the roller 30 so that subsequent advancement of the exposed film strip from the takeup spool 20 onto the supply spool 18 effects a clockwise rotation (as viewed in FIG. 3) of the coating roller. This coating roller 124 thus pumps processing fluid 116 from the wick 128 to form a meniscus 152 of fluid between the roller and the film strip 22.

Figure 4:
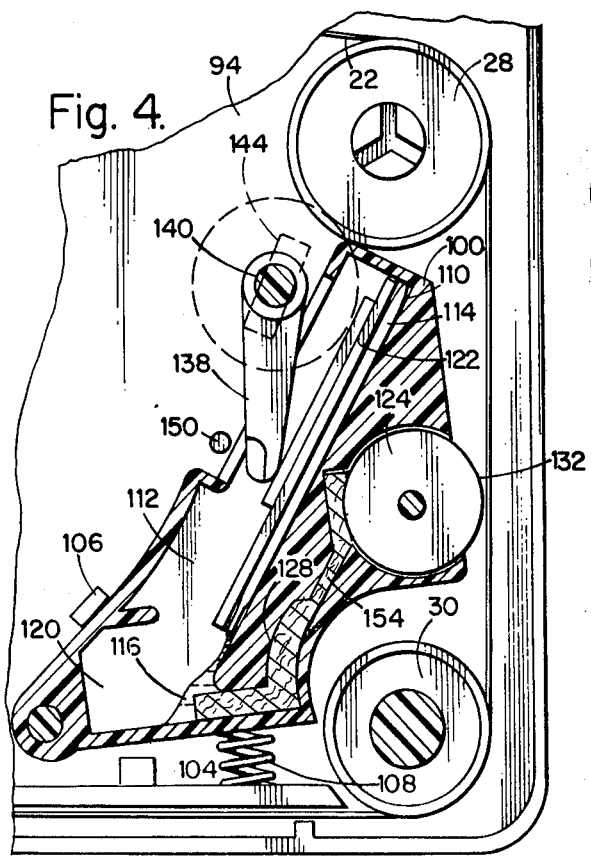
FIG. 4 is a view similar to FIG. 2 illustrating the applicator system of the cassette at such times as film processing operations have been completed and the applicator system returned to its original position.

When processing operations are completed, the pin 146 is withdrawn from the slotted recess 144 permitting the spring 108 to return the housing 100 to its initial position wherein it is seated against the stop 106. However, since the pod 114 is now flattened, the pressure plate 122 only displaces the lever arm 138 into a third position as shown in FIG. 4 intermediate its positions depicted in FIGS. 1 and 3 of the drawings. Thus, prior to film processing operations the slotted recess 144 is in its position shown in FIG. 1 of the drawings. When processing operations have been completed, this slotted recess 144 is in its position shown in FIG. 4 of the drawings. It will be recognized that this arrangement provides the cassette 10 with means for indicating to the viewer 99, i.e., through the viewer's sensor-actuator pin 146, whether or not the film strip within the cassette has been processed.

The rupturable pod 114 initially contains a quantity of the processing fluid 116 slightly in excess of that required to form visible images from the images recorded on the entire length of the film strip 22 during exposure operations. In this respect, it is desirable that the wick 128 be selected to have a storing capacity for at least the excess amount of the fluid 116. Thus, after film processing operations are completed, all of the excess fluid 116 is retained in the wick 128.

Typically, the wick 128 may be formed of any suitable material such as a fibrous cotton web. Further, it is desirable that the applicator system 60 include means for controlling the maximum rate at which the processing fluid 116 may be drawn from the reservoir chamber 120 and applied to the film strip 22. Such means may take any one of a variety of forms, e.g., controlling the pump roll speed, optimizing the lift height of the wick 128, providing valve means between the wick and the coating roller 124, etc. However, in the preferred embodiment, such means are provided by compressing a section 154 of the wick material so that this section of the wick 128 offers a greater resistance to capillary fluid flow than that offered by its other sections.

The cassette's housing members 12 and 14 and certain other parts of the cassette 10, e.g., the posts 162, the boss 46, the light sealing member 52, the spools 18 and 20, the assembly comprising the lever arm 138, the pin 140, the housing of the applicator system 60 and the pressure plate 122 may, if desired, also be formed from an acrylic, a polystyrene or acetal thermoplastic resin in inexpensive injection molding processes.

Various details of the cassette 10 do not constitute part of the present invention and, obviously, may readily take forms other than those described. Some of these features, e.g., the pressure plate assembly, the constant speed drive, the light reflecting element, and the snubbing arrangement are the subject of earlier filed applications assigned to the assignee of the present invention.

For exposure purposes, the cassette 10 is mounted in an appropriate camera (not shown) with the drive means of the camera engaging the fluted recess 64 of the takeup spool 20 through a friction clutching arrangement as is conventional. While the particular camera employed does not form part of the present invention, it should be noted that it should include an actuator pin located to enter the cassette 10 through its aperture 80 to restrain rotation of the cassette's rollers 32 and 34 at least during film exposure operations. The aperture plate of the camera, which may also take a conventional form, operably engages the cassette's pressure plate assembly 36 to position the section of the film strip 22 disposed thereacross in the proper focal plane. Also, a conventional intermittent film advancement mechanism of the camera engages the perforations 24 of the film strip 22 to effect its proper step advancement across the pressure plate assembly 36. In this manner, the operator can selectively record images on the photosensitive film strip 22 as it traverses the cassette's opening 16 on its way from the supply spool 18 to the takeup spool 22. In the embodiment illustrated, the photosensitive surface of the film strip 22 faces inwardly of the cassette 10 such that exposure of the photosensitive emulsion is effected through its transparent film base. After the film strip 22 has been completely exposed, the cassette can be quickly removed from the camera and replaced, when desired, by an identical cassette containing unexposed film. During these exposure operations, the film strip 22 is advanced from its initial position around the supply spool 18 to a position where it is coiled around the takeup spool 20 with the cassette's processing station 58 remaining in its normally inoperative position, i.e., in its condition depicted in FIG. 1 of the drawings.

Figure 7:
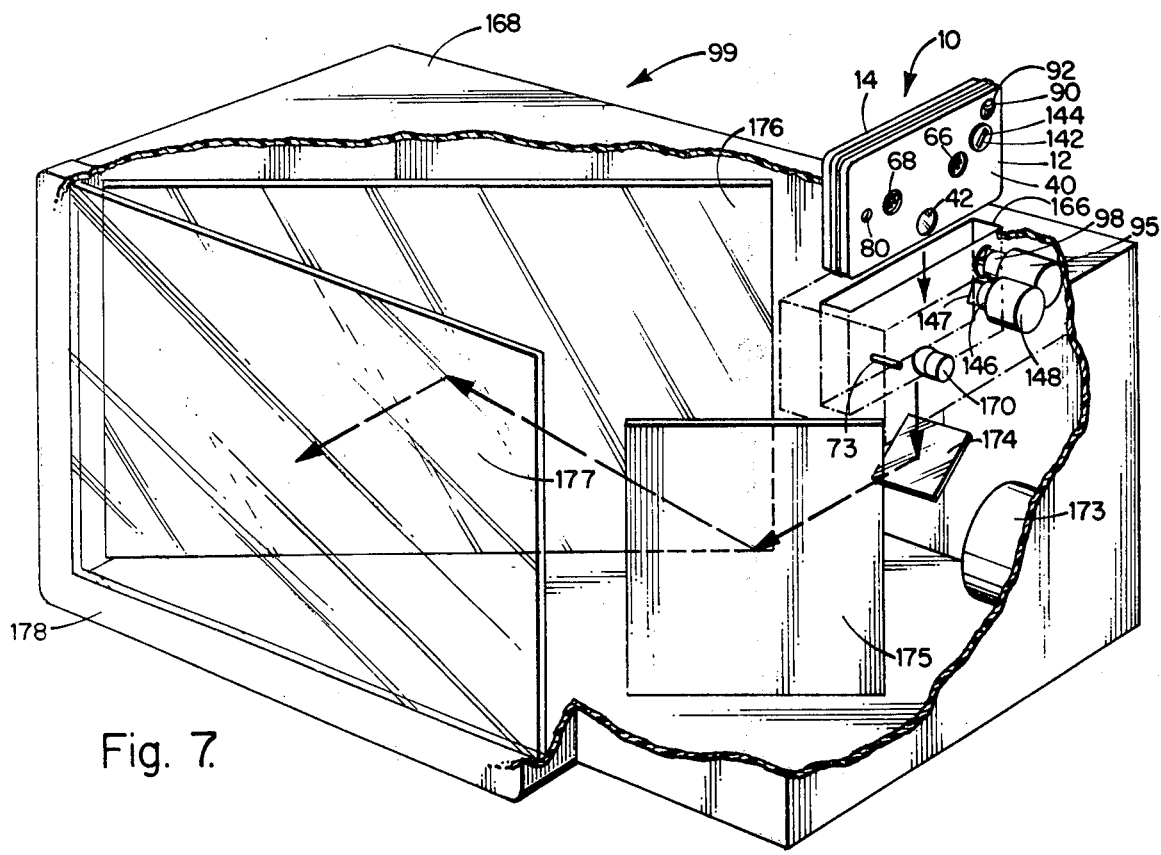
FIG. 7 is a diagrammatic cutaway perspective view of a viewer unit adapted to receive the film handling cassette shown in the other figures of the drawings to facilitate film processing and projection operations.

After the strip of photographic material 22 has been exposed during its travel from the supply spool 18 onto the takeup spool 20 with the cassette 10 mounted in an appropriate camera (not shown), the exposed film strip is preferably processed and projected with the cassette 10 mounted in the specially devised viewer unit 99 diagrammatically illustrated in FIG. 7 of the drawings. As shown therein, the cassette 10 is inserted downwardly into the viewer 99 through an elongated opening 166 appropriately provided in the viewer's top panel 168. When fully inserted therein, the light reflecting element 38 of the cassette 10 is disposed in operable relationship with a projection lamp 170 of the viewer 99. The lamp 170 is arranged to be selectively energized by a switch 171 (See FIG. 8) of the viewer 99. Further, at such time, the apertures 66 and 68 of the cassette 10 are respectively aligned with the aforementioned axially displaceable drive shafts 19 and 21 (See FIG. 8) connected to the viewer's motor 173 through conventional slip-clutch arrangements. Thus, the viewer includes means for selectively and alternately driving the supply spool 18 and takeup spool 20 of the cassette 10 in counterclockwise and clockwise directions, respectively, as viewed in FIG. 1 of the drawings.

The cassette 10 and viewer 99 are preferably provided with cooperating means for releasably latching the cassette in its operative position within the viewer and for selectively effecting an ejection of the cassette from the viewer. These latching and ejection means do not form part of the present invention and may take any suitable form, for instance, that depicted in copending patent application Ser. No. 838,793 filed on July 3, 1969, by Philip G. Baker and now U.S. Pat. No. 3,641,909 issued Feb. 15, 1972.

Mounted within the viewer 99, as previously indicated, for selective axial displacement toward and away from the cassette 10 is the snubber pin 73 which is axially aligned with the cassette's aperture 80 once the cassette 10 has been fully inserted into the viewer. Thus, the solenoid 75 (See FIG. 8) may be subsequently selectively energized to restrain rotation of the cassette's rollers 32 and 34.

Further, when the cassette 10 is disposed in its operative position within the viewer 99, the viewer's drive shaft 98 is axially aligned with the cassette's roller 28 and the viewer's sensor-actuator pin 146 is axially aligned with the cassette pin 140. Therefore, solenoids 95 and 148 may be subsequently energized to respectively engage the drive shaft 98 with the slots 96 of the roller 28 and the flattened end 147 of the sensor-actuator pin 146 with the slotted recess 144 of the cassette's pin 140 (See FIG. 6). In this connection, it should be noted that the initial axial orientation of the slotted recess 144 (Also see FIG. 1) is such as to be aligned with the initial axial orientation of the flattened end 147 of the sensor-actuator pin 146. The cassette's processing station 58 can then selectively be rendered operative by energizing the viewer's sensor-actuator pin 146 by the step motor 149. This operation has the effect of displacing the cassette's applicator system 60 from its position and condition depicted in FIG. 1 of the drawings into its position and condition depicted in FIG. 3 of the drawings. The drive shaft 98 may thus subsequently be energized by the viewer's motor 173 simultaneously with the actuation of the viewer's drive shaft 19 to effect the return of the exposed film strip from the cassette's takeup spool 20 onto its supply spool 18. As previously indicated, at such times the film strip is advanced at a constant speed through the cassette's operative processing station 58.

After the film strip 22 has been treated with the processing fluid 116 during its return to the supply spool 18, the solenoid 148 associated with the sensor-actuator pin 146 may be deenergized to effect its disengagement with the cassette's pin 140 whereby the cassette's spring 108 will effect a return of the cassette's applicator system 60 into its position and condition depicted in FIG. 4 of the drawings. It is important to note that, at such time, the axial orientation of the slotted recess 144 of the pin 140 is no longer in alignment with the original axial orientation of the flattened end of the viewer's sensor-actuator pin 146, to which axial position the sensor-actuator pin is automatically returned by the step motor 149 whenever it is withdrawn away from the cassette 10. It will thus be appreciated that the axial orientation of the cassette's slotted recess 144 constitutes means for indicating to the viewer whether the film strip 22 has been treated with the processing fluid 116. Further, the sensor-actuator pin 148, with its axially oriented flattened head 147, and in conjunction with a switch 195 (See FIG. 8) actuated responsive to the pin 148 seating in slotted recess 144, i.e., it detects the extent of axial displacement of the pin 148 towards the cassette's pin 140 and therefore the processed or unprocessed condition of the film strip 22 within the cassette 10, constitutes means for the viewer 99 to sense such indication from the cassette.

To facilitate film processing operations, or for that matter any operations involving the return of the film strip 22 from the takeup spool 20 to the supply spool 18 when the cassette is in the viewer 99, it is desirable to reduce frictional forces acting against the film. In this connection, the viewer 99 includes a solenoid 188 depicted in FIG. 8 of the drawings for selectively displacing pins 17 (See FIG. 1) inwardly of the cassette 10 against its pressure plate assembly 36. This action causes the pressure plate assembly 36 to move inwardly of the cassette thereby releasing the film strip 22 from its frictional engagement between the cassette's pressure plate assembly and the viewer's aperture plate 13.

The viewer includes a blinder 184 (See FIG. 1) which is displaceably mounted for selective movement responsive to the energizing of a solenoid 186 (Depicted in FIG. 8) between its normal position wherein it is disposed out of alignment with the cassette's film gate or opening 16 and its position depicted in phantom wherein it overlies that opening 16. During film processing operations; i.e., during that period of time when the cassette's processing station 58 is rendered operable and the film strip 22 is advanced therethrough at a constant speed towards the supply spool 18, the blinder 184 is disposed in its position shown in phantom to preclude light rays from striking the exposed unprocessed film strip 22 as it progresses across the cassette's opening 16. This blinder 184 may also include a member adapted to overlie the cassette's opening 42 during film processing operations.

Figure 8:
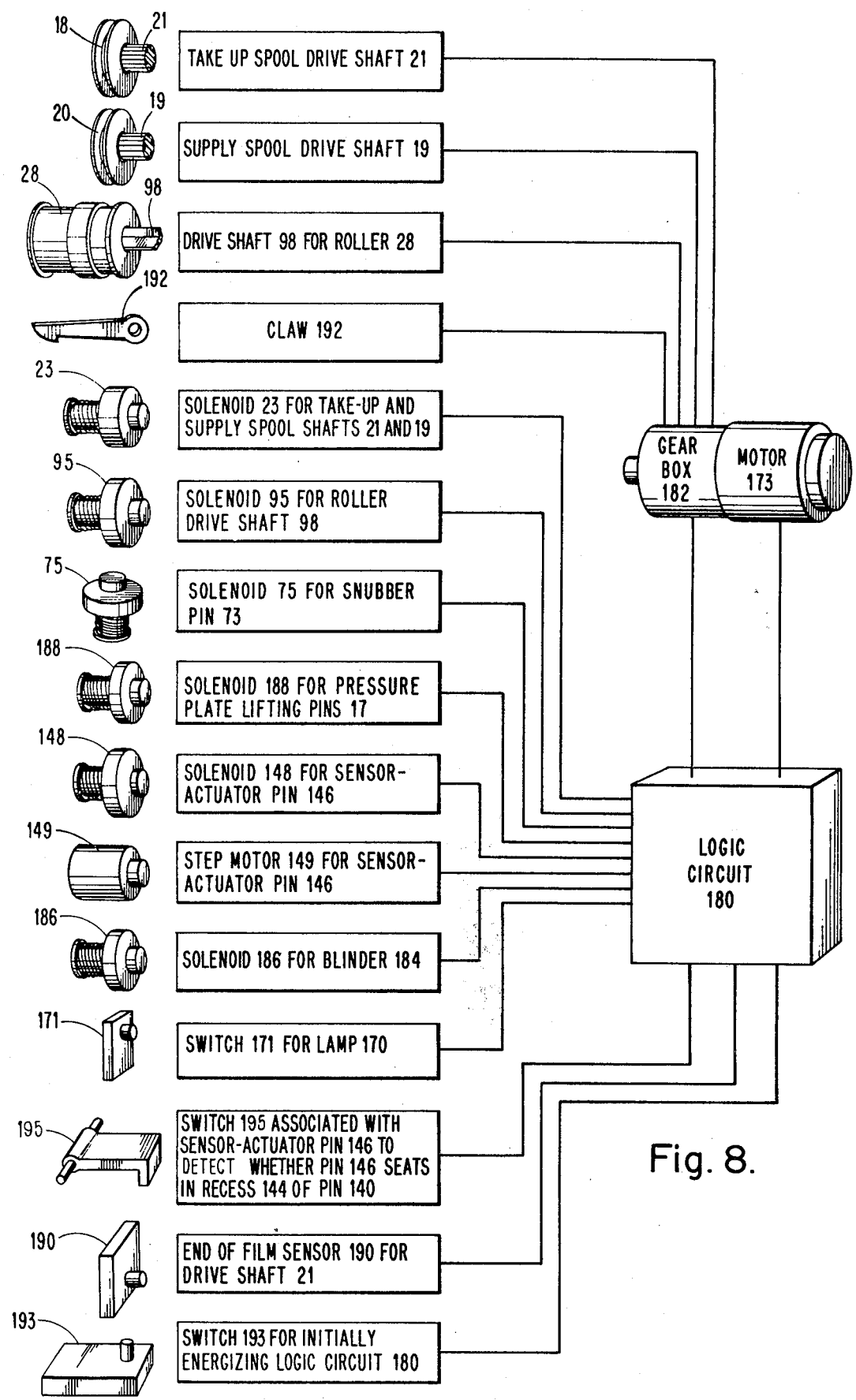
FIG. 8 is a block diagram of operational elements of a photographic system incorporating the present invention.

The viewer unit 99 further includes other conventional elements, e.g., an intermittent film advancement mechanism including the claw 192 depicted in FIG. 8, a shutter mechanism and a lens system. It will be appreciated that, once the film strip 22 has been treated with the processing fluid 116 during its initial return to the cassette's supply spool 18, the viewer's lamp 170, its drive shaft 21 and its aforementioned intermittent film advancement may be energized to effect a projection of the processed film strip as it is advanced across the cassette's opening 16 towards the takeup spool 20. Of course, during such operations rotation of the cassette's rollers 32 and 34 should be restrained by operation of the viewer's snubber pin 73 and the pins 17 withdrawn to permit the pressure plate assembly 36 to slideably engage the film strip 22 against the viewer's aperture plate 13. In connection with these film projection operations, light rays from the projection lamp 170 are redirected by the cassette's light reflecting element 38 outwardly of the cassette through the aperture 50 of the pressure plate assembly 36, the film strip 22 and the cassette's opening 16. These now image-carrying light rays are further redirected by a plurality of mirrors 174, 175 and 176 (See FIG. 7) and focused by the viewer's lens system onto a rear projection viewing screen 196 mounted in the front panel 178 of the viewer 99.

Complementary means may be provided in the viewer and cassette, if desired, to effect a flow of air through the cassette during film processing and/or film projection operations.

To facilitate photographic operations employing the cassette 10, it is desirable that the viewer 99 include an end of film sensing arrangement to provide an indication when the film strip 22 has reached either end of its travel between the spools 18 and 20. Such an arrangement may for instance include a sensor 190, depicted in FIG. 8, operably associated with that portion of the drive shaft 21 for the cassette's takeup spool 20 intermediate that cassette spool and the friction clutch associated with the shaft. In this type of arrangement, the jam sensor 190 would detect, in any suitable manner, when that portion of the drive shaft ceased rotation. Of course, during projection operations the rotation of that portion of the drive shaft is normally intermittent due to the snubbing action of the then stationary rollers 32 and 34 on the film 22. More specifically, since the drive shaft 21 operates through a friction clutch it only rotates to take up film when the projector claw 192 has "pushed" sections of the film strip 22 away from frictional engagement with the rollers 32 and 34. Therefore the jam sensing arrangement of the type suggested would include a timing device that would preclude an indication being generated therefrom during such normal intermittent motion of the drive shaft 21. In other words, the jam sensing arrangement would produce an output signal only when the drive shaft 21 had not rotated for a predetermined amount of time in excess of that time required for the claw 192 to engage the film strip 22 a preselected plurality of times. It will be appreciated that signals provided by the jam, or end-of-film, sensing arrangement to the logic circuit 180 serve to assist that circuit in sequencing the functions of the operational programs, for instance, reverse-process, forward-projection, reverse-rewind.

Figure 9A:
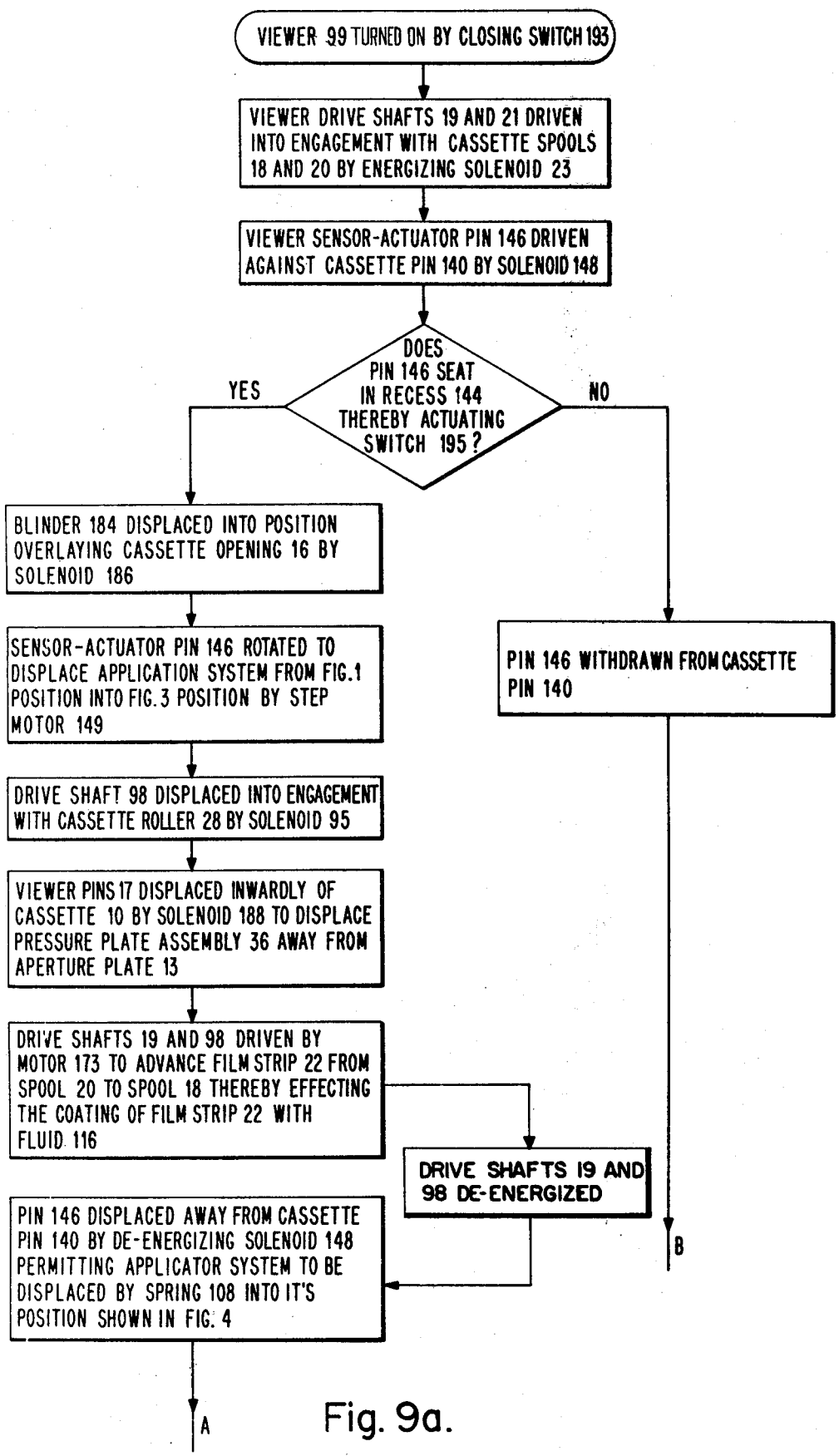
FIGS. 9A and 9B constitute a block diagram illustrating the operational sequence of a photographic system incorporating the present invention.
Figure 9B:
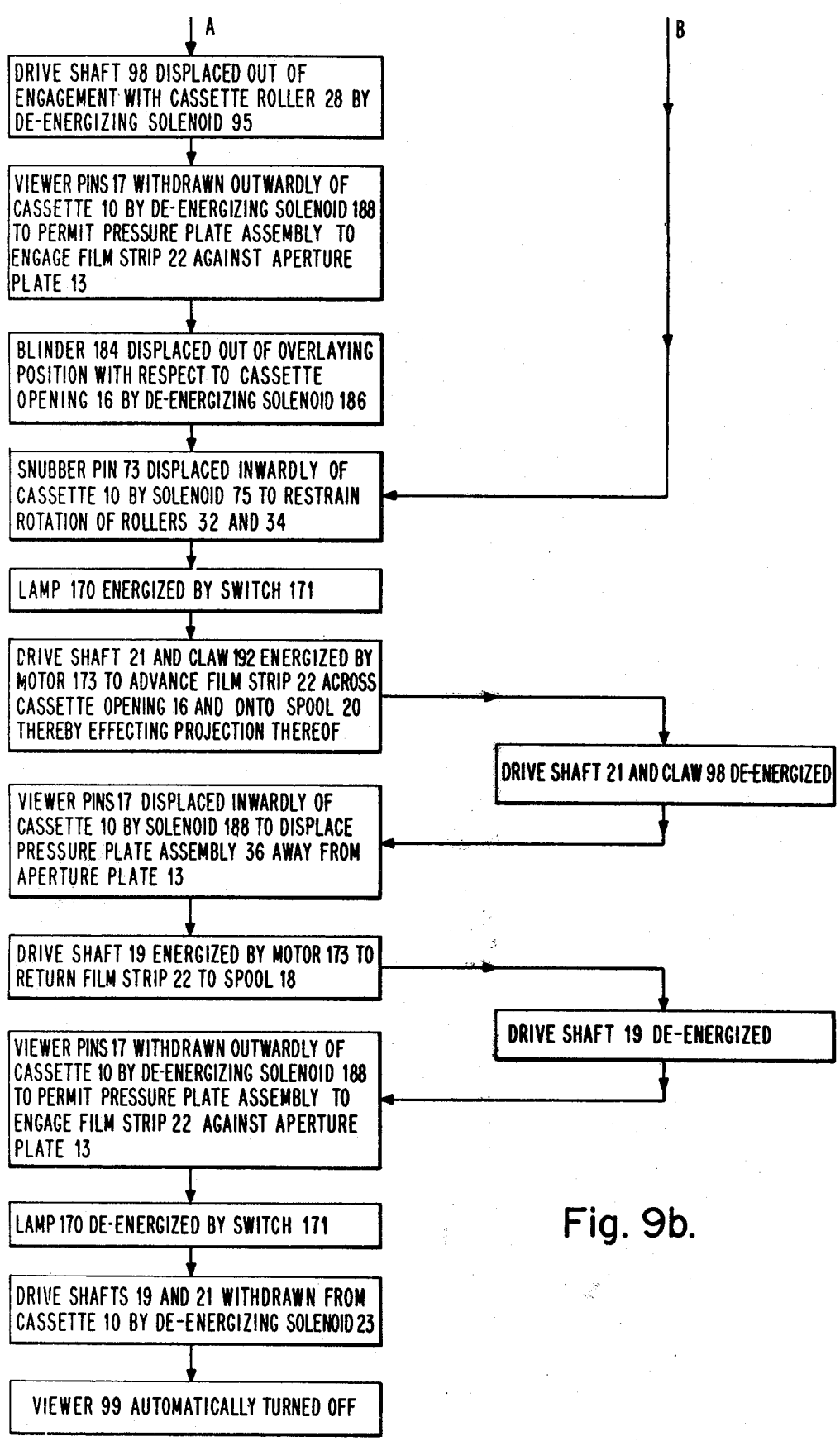

FIG. 8 diagrammatically illustrates the certain operational elements of the viewer 99, while FIG. 9 diagrammatically illustrates the operational sequence of system operations employing those elements. In this respect, it will first be noted by referring to FIG. 8 that the viewer 99 includes a logic circuit 180. The design details of the logic circuit 180 comprise no part of the present invention and, since they may take any suitable form, have not been set forth herein. However, it is pointed out that the logic circuit 180 receives the necessary inputs from a viewer actuating switch 193, the switch 195 associated with the axial displacement of the sensor-actuator pin 146 and the end of film sensor 190 to control system operation in accordance with predetermined programs. further, the logic circuit 180 provides information to the motor 173 and an associated gear box 182 as necessary for the programmed operations of the viewer's drive shafts 19, 21 and 98 and its claw 192.

This logic circuit 180 further provides necessary information to the lamp switch 171, the step motor 149 and the solenoids 23, 75, 95, 148, 186 and 188 to effect the desired operational programs on the film strip 22.

FIG. 9 clearly illustrates the operational sequence automatically performed by the photographic system when a cassette 10 is inserted into the viewer 99 and the viewer turned on. It should be recognized that FIG. 9 is a diagrammatic representation and the order of certain steps in the sequence may be reversed if desired. Additionally, certain steps may obviously be performed in unison. Since FIG. 9 is completely self-descriptive, any further detailed discussion of this operational sequence would be redundant and unnecessarily complicate the specification. However, it is particularly significant to note that once the viewer has been turned on, its sensor-actuator pin 146 in conjunction with its associated switch 195 automatically receives an indication from the cassette pin 40, i.e., resulting from the orientation of the slotted recess 144 of that pin 140, as to whether the film strip 22 retained in that particular cassette has been processed. If it has not been processed, cooperating means of the cassette 10 and viewer 99 automatically effect the performance of a first operational program with the film strip 22, i.e., processing, projection and rewind onto supply spool 18. If it has previously been processed, cooperating means of the cassette 10 and viewer 99 automatically effect the performance of an alternate operational program on the film strip 22, i.e., projection and rewind onto the supply spool 18.

Those familiar with the photographic arts will readily appreciate the novel and highly unique advantages of this invention. Obviously the invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. A photographic system comprising:
   a cassette including:
     a housing;
     a strip of material stored within said housing;
     a normally inoperative applicator system for expressing processing fluid onto an incremental section of said strip of photographic material, said applicator system including a coating roller initially spaced apart from said strip of photographic material and mounted for selective displacement into contact with said strip of photographic material;
     a member responsive to externally mounted actuating means, said member being rotatably mounted within said cassette to render said applicator system operative when it is rotated, said member having first means accessible to such externally mounted actuating means and configured for engagement therewith and said member being arranged to selectively effect the displacement of said coating roller from its said initial position into contact with said strip of photographic material when said member is so rotated; and
     second means, independent of said member, responsive to externally mounted actuating means for effecting the progressive advancement of said strip of photographic material past said applicator system after said system has been rendered operable; and apparatus including:
  first means for receiving said cassette;
  second means for actuating said cassette member including a rotatably mounted member positioned and configured to engage said first means of said cassette member when said cassette is received in said first means of said apparatus; and
  third means, independent of said second means of said apparatus, for actuating said second means of said cassette including a rotatably mounted drive shaft configured to engage said first means of said cassette.

2. A photographic system comprising:
a cassette including:
  a housing;
  a strip of photographic material stored within said housing;
  first means for releasably storing a quantity of processing fluid;
  second means for expressing such fluid onto an incremental section of said strip of photographic material, said second means of said cassette communicating with such fluid when it is released from said first means of said cassette and mounted in said housing for displacement between a first position wherein it is disposed out of operative relationship with said strip of photographic material and a second position wherein it is disposed in operative relationship with an incremental section of said strip of photographic material.
  a member rotatably mounted within said cassette housing responsive to externally mounted actuating means to effect the displacement of said second means of said cassette from its said first position into its said second position and for effecting the release of such fluid from said first means of said cassette when said member rotates, said member having third means accessible to such externally mounted actuating means and configured for engagement therewith; and
  fourth means responsive to externally mounted actuating means for effecting the progressive advancement of said strip of photographic material past said second means of said cassette after such fluid has been released from said first means of said cassette; and
apparatus including:
  first means for receiving said cassette;
  second means for actuating said cassette member including a rotatably mounted member configured to engage said third means of said cassette member when said cassette is received in said first means of said apparatus; and
  third means for actuating said fourth means of said cassette including a rotatably mounted drive shaft.

3. The photographic system of claim 2 wherein said second means of said cassette includes a coating roller.

4. The photographic system of claim 3 wherein said cassette additionally includes means for driving said coating roller in a direction opposite to that in which said strip of photographic material is advanced thereacross.

5. Photographic apparatus for use with a film handling cassette including a housing, a strip of photographic material stored within such housing, first means for releasably storing a quantity of processing fluid, second means for expressing such fluid onto an incremental section of such strip of photographic material, such second means of such cassette communicating with such fluid when it is released from such first means of such cassette and mounted in such housing for displacement between a first position wherein it is disposed out of operative relationship with such strip of photographic material and a second position wherein it is disposed in operative relationship with an incremental section of such strip of photographic material, a member rotatably mounted within such cassette housing responsive to externally mounted actuating means to effect the displacement of such second means of such cassette from its such first position into its such second position and for effecting the release of such fluid from such first means of such cassette when such member rotates, such member having third means accessible to such externally mounted actuating means and configured for engagement therewith and fourth means responsive to externally mounted actuating means for effecting the progressive advancement of such strip of photographic material past such second means of such cassette after such fluid has been released from such first means of such cassette, said photographic apparatus comprising first means for receiving such cassette; second means for actuating such cassette member when such cassette is received in said first means of said apparatus including a rotatably mounted member configured to engage such third means of such cassette member in a manner to impart a rotary motion thereto when it is rotatably driven; actuable third means for actuating such fourth means of such cassette including a rotatably mounted drive shaft; a motor; and means for controlling the operation of said motor to cause it to rotate said rotatably mounted member of said apparatus thereby bringing such fluid into contact with such strip of photographic material and to subsequently actuate said third means of said apparatus to effect the progressive movement of such strip of photographic material past such second means of such cassette thereby to effect the progressive coating of the entire length of such strip of photographic material with such fluid.

6. A photographic system comprising:
  a cassette including;
    a housing;
    a strip of photographic material; and
    first means for cooperating with other apparatus when said cassette is operably associated therewith for performing a first operational program with said strip of photographic material or alternately performing at least one of other operational programs with said strip of photographic material and for indicating to the other apparatus whether said first operational program has been performed, said first cassette means including a rotatably mounted member having a portion thereof accessible from a position exterior of said cassette housing configured to indicate its orientation with respect to said cassette housing and which is rotatably displaced in connection with the performance of said first operational program; and apparatus including:
a housing configured to operably receive said cassette; and
first means for sensing the indication of said first cassette means and for cooperating with said first cassette means to effect said first operational program if said first cassette means indicates that said first operational program has not been performed or alternately cooperating with said first cassette means to effect said one other operational program with said strip of photographic material if said first cassette means indicates that said first operational program has been performed.

7. The photographic system of claim 6 wherein said first operational program includes treating said strip of photographic material with a processing fluid.

8. The photographic system of claim 6 wherein said first operational program includes treating said strip of photographic material with a processing fluid and projecting one or more viewable images formed on said strip of photographic material as a result of said treatment and said one other operational program includes projecting said viewable image or images.

9. Photographic apparatus for use with a cassette including a housing, a strip of photographic material and first means for cooperating with other apparatus when such cassette is operably associated therewith for performing a first operational program with such strip of photographic material or alternately performing at least one of other operational programs with such strip of photographic material and for indicating to such other apparatus whether said first operational program has been performed, such first cassette means including a rotatably mounted member having a portion thereof accessible from a position exterior of such cassette housing configured to indicate its orientation with respect to such cassette housing and which is rotatably displaced in connection with the performance of said first operational program, such accessible portion of such rotatably mounted cassette member being configured to be engaged by an externally mounted member, said apparatus including a housing configured to operably receive such cassette and first means for sensing the indication of such first cassette means and for cooperating with such first cassette means to effect said first operational program if such first cassette means indicates that said first operational program has not been performed, said first apparatus means including a rotatably mounted member configured to engage such rotatably mounted cassette member only when rotationally aligned therewith.

10. Photographic apparatus for use with a cassette including a housing, a strip of photographic material and first means for cooperating with other apparatus when such cassette is operably associated therewith for performing a first operational program with such strip of photographic material or alternately performing at least one of other operational programs with such strip of photographic material and for indicating to such other apparatus whether said first operational program has been performed, such first cassette means including a rotatably mounted member having a portion thereof accessible from a position exterior of such cassette housing configured to indicate its orientation with respect to such cassette housing and which is rotatably displaced in connection with the performance of said first operational program, such accessible portion of such rotatably mounted cassette member being configured to be engaged by an externally mounted member, said apparatus including a housing configured to operably receive such cassette and first means for sensing the indication of such first cassette means and for cooperating with such first cassette means to effect said one other operational program with such strip of photographic material if such means of such cassette indicates that said first operational program has been performed, said first apparatus means including a rotatably mounted member configured to engage such rotatably mounted cassette member only when rotationally aligned therewith.

11. A photographic system comprising:
a cassette including:
a housing;
a strip of photographic material stored within said housing;
a normally inoperative applicator system, including a rotatably mounted coated roller, for expressing processing fluid onto an incremental section of said strip of photographic material;
a member responsive to externally mounted actuating means, said member being rotatably mounted within said cassette to render said applicator system operative when it is rotated, said member having first means accessible to such externally mounted actuating means and configured for engagement therewith;
second means responsive to externally mounted actuating means for effecting the progressive advancement of said strip of photographic material past said applicator system after said system has been rendered operable; and
means for driving said coating roller in a direction opposite to that in which said strip of photographic material is advanced thereacross; and
apparatus including:
first means for receiving said cassette;
second means for actuating said second means of said cassette including a rotatably mounted drive shaft; and
third means for actuating said cassette member including a rotatably mounted member positioned and configured to engage said first means of said cassette member to cause said coating roller to rotate in a direction opposite to that in which said strip of photographic material is advanced therepast when said cassette is received in said first means of said apparatus.

12. Photographic apparatus for use with a cassette including a housing, a strip of photographic material and first means for cooperating with said apparatus when such cassette is operably associated therewith for performing a first operational program with such strip of photographic material or alternately performing at least one of other operational programs with such strip of photographic material and for indicating to said apparatus whether said first operational program has been performed, such first cassette means including a rotatably mounted member having a portion thereof accessible from a position exterior of such cassette housing configured to indicate its orientation with respect to such cassette housing and which is rotatably displaced in connection with the performance of said first operational program, such accessible portion of such rotatably mounted cassette member being configured to be engaged by an externally mounted member, said apparatus including a housing configured to operably receive such cassette and first means for sensing the indication of such first cassette means and for cooperating with such first cassette means to effect said first operational program if such first cassette means indicates that said first operational program has not been performed or alternately cooperating with such first caassette means to effect said one other operational program with such strip of photographic material if such first means of such cassette indicates that said first operational program has been performed, said first apparatus means including a rotatably mounted member configured to engage such rotatably mounted cassette member only when rotationally aligned therewith.

13. The photographic apparatus of claim 12 wherein said first operational program includes treating such strip of photographic material with a processing fluid.

14. The photographic apparatus of claim 12 wherein said first operational program includes treating such strip of photographic material with a processing fluid and projecting one or more viewable images formed on such strip of photographic material as a result of said treatment and said one other operational program includes projecting such viewable image or images.

15. The photographic apparatus of claim 12 wherein said first operational program includes treating such strip of photographic material with a processing fluid and said one other operational program does not include treating such strip of photographic material with a processing fluid.

16. The photographic apparatus of claim 12 wherein said first apparatus means additionally includes means for driving said rotatably mounted apparatus member to effect a rotation of such rotatably mounted cassette member when engaged therewith.

* * * * *